United States Patent [19]
Hosack et al.

[11] Patent Number: 5,459,456
[45] Date of Patent: Oct. 17, 1995

[54] METHOD AND APPARATUS FOR SELECTIVELY FORWARDING MESSAGES RECEIVED BY A RADIO RECEIVER TO AN EXTERNAL DEVICE

[75] Inventors: Nichola B. Hosack, Coral Springs; Gregory L. Cannon, Boynton Beach, both of Fla.

[73] Assignee: Motorola, Inc., Schaumburg, Ill.

[21] Appl. No.: 119,303

[22] Filed: Sep. 13, 1993

[51] Int. Cl.[6] .................................................... G06F 11/00
[52] U.S. Cl. ...................... 340/825.44; 371/5.1; 371/5.5
[58] Field of Search ......................... 340/825.17, 825.48, 340/825.44; 371/5.1, 5.5, 5.3, 20.1

[56] References Cited

U.S. PATENT DOCUMENTS

| | | |
|---|---|---|
| 4,866,712 | 9/1989 | Chao .......................................... 371/5.1 |
| 4,941,161 | 6/1990 | Cook .......................................... 371/5.1 |
| 5,043,721 | 8/1991 | May . |
| 5,051,999 | 9/1991 | Erhart et al. . |
| 5,223,827 | 6/1993 | Bell et al. ................................... 371/5.1 |

Primary Examiner—Michael Horabik
Attorney, Agent, or Firm—Kelly A. Gardner; John H. Moore; Daniel K. Nichols

[57] ABSTRACT

A radio receiver (110) can be coupled to first and second external devices (345) for communication therewith. A method in the radio receiver (110) for processing and forwarding received messages comprises the steps of determining a number of errors included in a first message and determining that the first external device (345) is coupled to the radio receiver (110). The method further comprises the step of comparing the number of errors included in the first message to a first value associated with the first external device (345) in response to determining that the first external device (345) is coupled to the radio receiver (110). Thereafter, the first message is provided to the first external device (345) when the number of errors included in the first message is less than the first value.

20 Claims, 5 Drawing Sheets

5,459,456

METHOD AND APPARATUS FOR SELECTIVELY FORWARDING MESSAGES RECEIVED BY A RADIO RECEIVER TO AN EXTERNAL DEVICE

FIELD OF THE INVENTION

This invention relates in general to selective call messaging, and more specifically to a method and apparatus for providing messages received by a radio receiver to an external device coupled thereto.

BACKGROUND OF THE INVENTION

Selective call messaging, such as paging messaging, involves transmitting a message or a page to an intended radio receiver by radio frequency (RF) signals. The page is received from an originator at a selective call terminal and is encoded, along with an address assigned to the radio receiver, into a format recognizable by the receiver. Additionally, in many paging formats, error correction information is encoded as well. This error correction information is typically in the form of parity bits which can be later utilized by the radio receiver to detect and correct errors in the message. The message is then transmitted for reception within a selective call system coverage area in which the receiver is expected to be located.

Conventionally, the selective call message is received and decoded by the radio receiver having the address included with the message. Thereafter, error correction computations are performed, using the transmitted parity bits, to detect and correct any errors in the message. However, typical algorithms for error correction only provide for the correction of a small number of bits of the message. Consequently, when the number of errors in the message is greater than a predetermined number, the message can not be entirely corrected. In this situation, the message is usually discarded. Conversely, when the message is received with no errors or when the errors can be corrected, the message is stored and, in many types of conventional receivers, presented to a user using a presentation device, e.g., a display, included in the receiver. In this manner, the user is prevented from reading erroneous messages which may be unintelligible.

As technology has advanced, smaller, more streamlined radio receivers have been developed in which, due to space constraints, no presentation device is included. Instead, such a radio receiver is coupled to an external presentation device to which received and stored messages are downloaded. The external presentation device can be, for instance, a personal computer, a printer, or other types of devices adapted to receive messages from a radio receiver. The user can, in this way, read the messages from the external device, e.g., printer or personal computer. Using this technology, selective call messages are still normally error-corrected to the extent provided for by the error correction algorithm which is used by the radio receiver. However, because the messages can now be downloaded to many different types of external presentation devices, some of which may include additional computing power, there exists an opportunity to process received messages in different ways depending upon the type of device to which a message is to be downloaded.

SUMMARY OF THE INVENTION

A method for processing and forwarding information received by a radio receiver capable of coupling to first and second external devices to communicate therewith, comprising the steps of receiving a message comprising words, processing the message to correct errors in correctable words and detect errors in non-correctable words, and storing the message, as processed, in a memory. The method further includes the steps of counting, in response to the storing step, a number of remaining errors within the message after the words of the message have been processed to correct and detect the errors in the words, determining which of the first and second external devices is an active device to which the radio receiver is coupled, and comparing, in response to the determining step, the number of remaining errors with a stored number of permitted errors associated with the active device. The message is provided to the active device in response to determining that the number of remaining errors does not exceed the stored number of permitted errors, A radio receiver for coupling to first and second external devices and for receiving a message comprising words includes an error detector/corrector for processing the words of the message to correct errors in correctable words and detect errors in non-correctable words. A memory coupled to the error detector/corrector stores the message, including words that have been corrected and words that have not been corrected. Counting circuitry coupled to the memory counts, in response to storage of the message, a number of remaining errors included in the message after processing of the words of the message by the error detector/corrector, and a storing circuit stores first and second numbers of permitted errors associated, respectively, with the first and second external devices, and stores an indication of which of the first and second external devices is an active device to which the radio receiver is coupled. A comparing circuit compares the number of remaining errors in the message with a selected number included in the first and second numbers of permitted errors, wherein the selected number is associated with the active device, and a providing circuit provides the message to the active device only in response to a determination that the number of remaining errors does not exceed the selected number.

DESCRIPTION OF A PREFERRED EMBODIMENT

Figure 1:
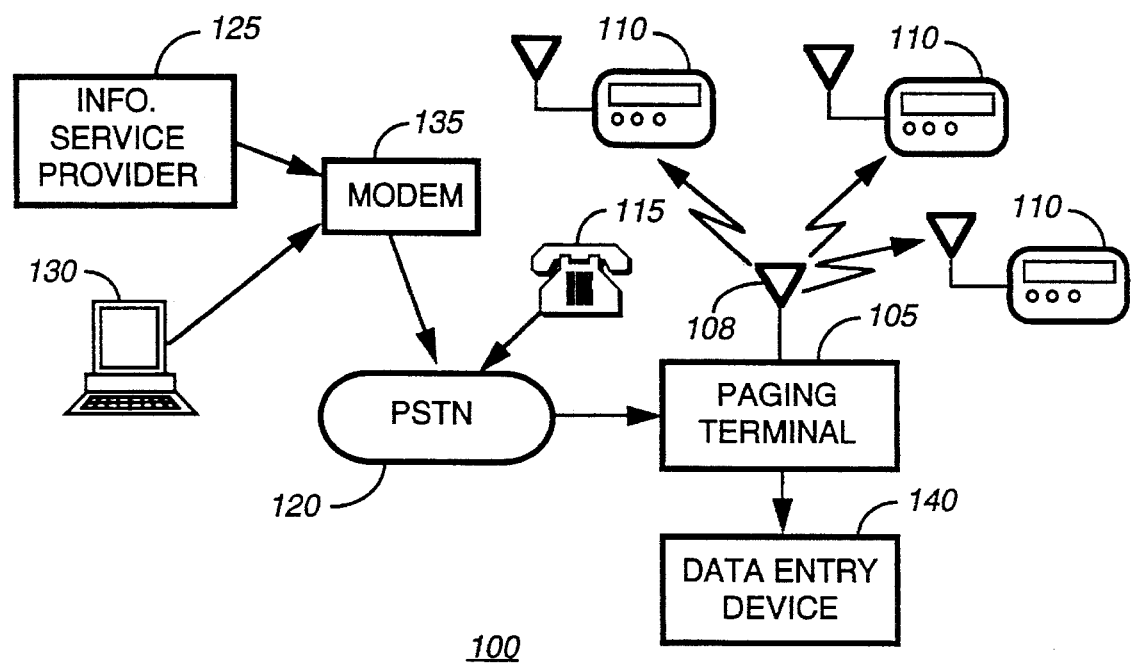
FIG. 1 is an illustration of a radio communication system in accordance with a preferred embodiment of the present invention.

FIG. 1 is an illustration of a paging system 100 providing for radio frequency (RF) communication. The paging system 100 preferably comprises a paging terminal 105 for encoding information using a signaling protocol such as the POCSAG (Post Office Code Standardization Advisory Group) protocol or the GSC (Golay Sequential Code) protocol. The encoded information is then modulated and transmitted by an antenna 108 as an RF signal, which is received by radio receivers 110 included in the paging system 100.

Information can enter the paging system 100 from a variety of sources, for example, from a conventional telephone 115 coupled to the paging terminal 105 via a telephone system, such as the public switched telephone network (PSTN) 120. Additionally, the paging terminal 105 can receive information from other sources, such as an information service provider 125, which provides news information, stock information, etc. in the form of databases, or a personal computer 130 coupled to the PSTN 120 by a modem 135. A data entry device 140 coupled directly to the paging terminal 105 can be employed to provide paging information to the paging terminal 105 or to modify operating information stored by the paging terminal 105. The operating information can be, for example, a listing of subscribers to the paging system 100 or a billing status of each subscriber.

Figure 2:
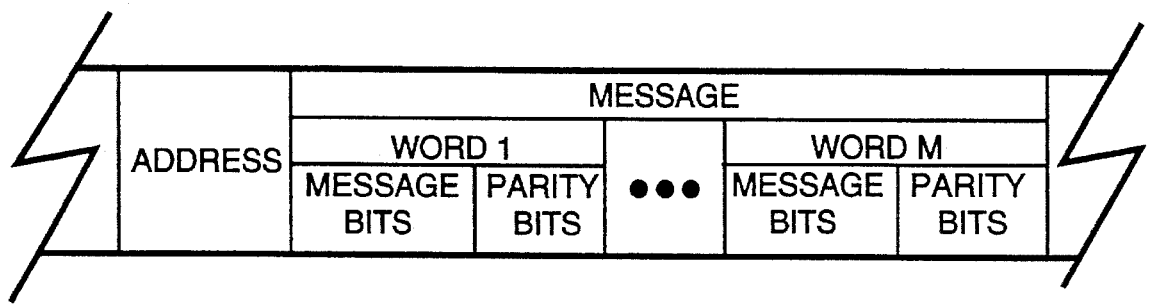
FIG. 2 is a signalling diagram depicting a radio frequency signal transmitted by a paging terminal included in the radio communication system of FIG. 1 in accordance with the preferred embodiment of the present invention.

FIG. 2 is a signalling diagram depicting an RF signal transmitted to a radio receiver 110 in accordance with a preferred embodiment of the present invention. The RF signal as shown comprises an address associated with the radio receiver 110 targeted for reception of a following message. The message following the address preferably includes one or more words, each of which is formed from a predetermined number of message bits and a predetermined number of parity bits, i.e., error correction information, which is utilized by the radio receiver 110 to detect and correct erroneous bits within the message word. The parity bits included within each message word are calculated and encoded in the RF signals using any of numerous conventional techniques. Each word can, for example, be encoded using the (31,26) BCH error correction code, in which a thirty-one bit word comprises twenty-six bits of message information and five bits of parity information and is formed in accordance with the BCH (Bose, Chaudhuri, and Hocquenghem) error correction code. Using this particular code, one bit of erroneous information can be corrected for each word, and two bits of erroneous information can be detected. Other well known codes allow the correction and detection of different numbers of erroneous bits.

Figure 3:
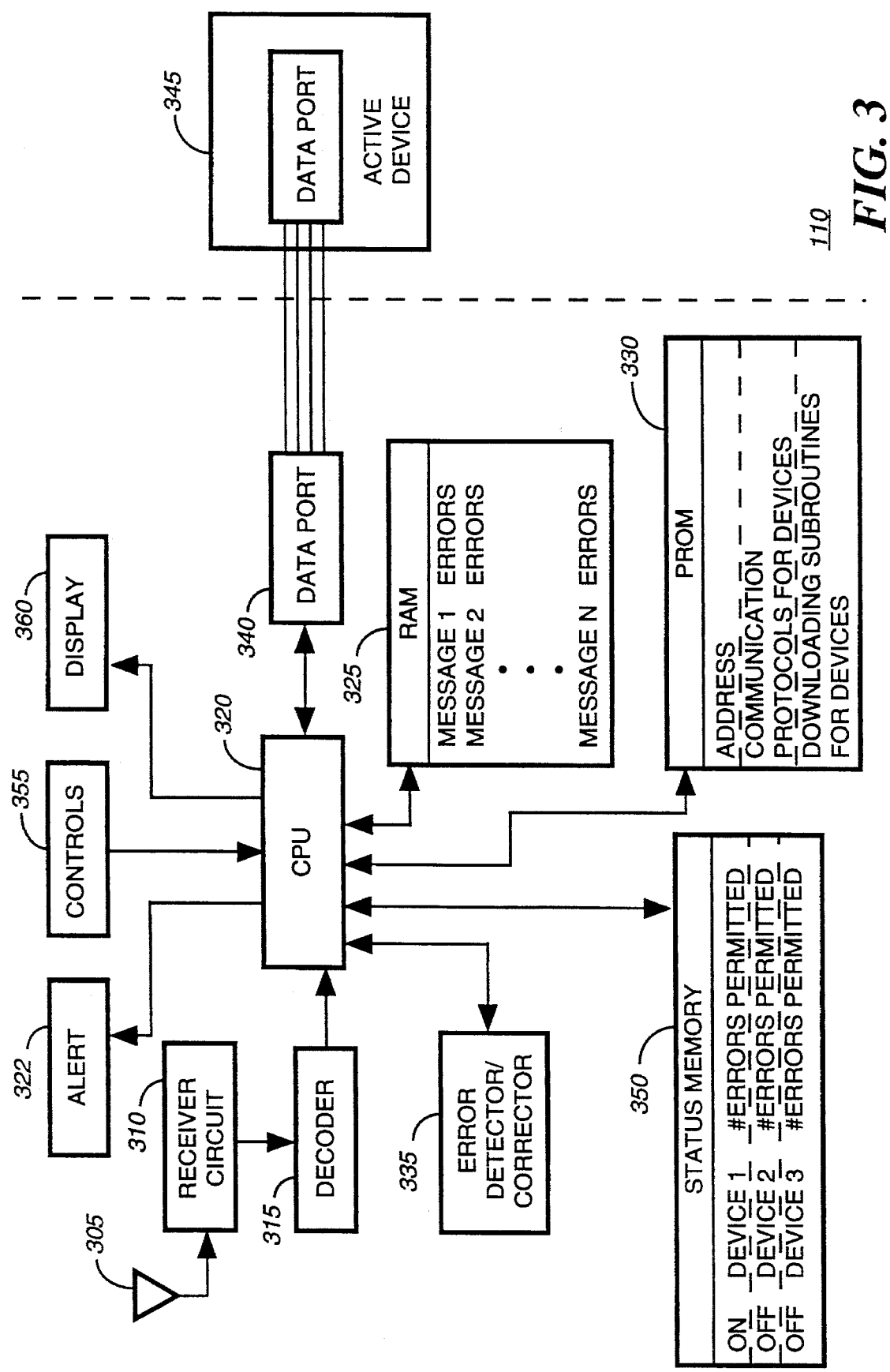
FIG. 3 is an electrical block diagram of a radio receiver included in the radio communication system of FIG. 1 in accordance with the preferred embodiment of the present invention.

Referring next to FIG. 3, an electrical block diagram of a radio receiver 110 in accordance with the preferred embodiment of the present invention is shown. The radio receiver 110 comprises an antenna 305 for receiving the RF signal and a receiver circuit 310 coupled to the antenna 305 for demodulating the signal to generate data therefrom. A decoder 315 coupled to the receiver circuit 310 decodes the data to recover the address and the message included in the signal. A central processing unit (CPU) 320 then further processes the information provided by the decoder 315 when the received address is equivalent to a stored address, indicating that the message is intended for reception by the radio receiver 110. When the message is intended for reception by the radio receiver 110, the CPU 320 generates a signal in response to which a sensible alert 322, e.g., a transducer, a vibrating motor, or a light emitting diode, is activated to announce message reception to a user.

The message is preferably stored in a memory, such as a random access memory (RAM) 325, for temporarily storing both messages and variables derived during operation of the radio receiver 110. Additionally, another memory, such as a programmable read only memory (PROM) 330, is coupled to the CPU 320 for storing operational parameters of the radio receiver 110 and subroutines executed by the CPU 320 during operation of the radio receiver 110. The paging address associated with the radio receiver 110 can also be stored in the PROM 330. According to the preferred embodiment of the present invention, the radio receiver 110 further comprises an error detector/corrector 335 for determining the number of bits in error for each word included in the message. When possible, the error detector/corrector 335 is also employed to correct any erroneous bits. As described above, the error detector/corrector 335 can correct one erroneous bit and detect two erroneous bits when (31,26) BCH code words are utilized. Circuits and method for performing error correction are taught in detail in U.S. Pat. No. 5,051,999 by Erhart et al., which is assigned to Motorola, Inc. and which is hereby incorporated by reference. Preferably, when the error detector/corrector 335 has processed the message, the RAM 325 is used to store, for each stored message, the number of errors remaining in the message after correction and an indication of which message words contain the errors.

In accordance with the present invention, the radio receiver 110 can conveniently be coupled to external devices for downloading messages thereto. For example, the radio receiver 110 can be coupled to a personal computer, which can receive the messages and further process them utilizing appropriate software loaded onto the personal computer by the user. The personal computer can also display the messages to the user on a monitor which is much larger than standard displays included in smaller radio receivers, such as pagers. The radio receiver 110 could also be coupled to non-intelligent devices, such as a printer for printing the messages or a modem for transmitting the messages over telephone lines to another device. These external devices can simply and advantageously be used as message presentation devices for radio receivers which do not include displays or other means of presenting a message to the user. As briefly described in the Background of the Invention hereinabove, smaller paging devices sometimes, due to space constraints, include no presentation device at all. Therefore, the messages received by the pager must be provided to another device, such as a personal computer or a printer, for display to a user.

The radio receiver 110 is preferably coupled, via a data port 340, to only a single external device at a time. The external device to which the radio receiver 110 is coupled is referred to as the active device 345. The active device 345 can be designated in a number of ways. For instance, when the user only anticipates coupling the radio receiver 110 to a single type of device, e.g., a printer, the radio receiver 110 can be programmed by a service provider to include the communication protocol necessary for communication with the chosen device. When, alternatively, the user plans to couple the radio receiver 110 to different types of external devices, the radio receiver 110 is programmed with communication protocols corresponding to each of the external devices desired by the user. These communication protocols can be stored in the PROM 330, along with downloading subroutines performed by the CPU 320, depending upon the type of active device 345, when messages are to be downloaded.

Preferably, a status memory 350 is coupled to the CPU 320 for storing a listing of the different devices. Additionally, an indication of which device is active is stored in the status memory 350. In FIG. 3, the active device 345 is device 1, which is shown as "on". The other devices are shown as "off". In practicality, different memory bits can be set to indicate whether a device is on or off. For example, bits of memory registers corresponding to devices which are off can simply be set to zero to indicate the off status, while the device which is on can be indicated by setting a bit to one in the memory register corresponding to the device which is on, i.e., the active device. The status of a device as on or off is preferably determined by the user, who can manipulate user controls 355 coupled to the CPU 320 to indicate which device is to be the active device. In the case of a small number of external devices, this can be accomplished by user manipulation of a toggle switch (not shown), the number of settings of which is equivalent to the number of devices listed in the status memory 350. When, for instance, the radio receiver 110 can be coupled to either a printer or a personal computer, a toggle switch on the exterior of the radio receiver 110 could be moved between two settings labeled "printer" and "computer". The CPU 320 could recognize the placement of the switch and appropriately set the memory registers in the status memory 350 in a manner well known to one of ordinary skill in the art.

In accordance with the present invention, the status memory 350 is further employed to store a value for each external device listed therein. This value corresponds to a "number of permitted errors" for each device. Preferably, a message is only downloaded to the active device 345 when the number of errors in the message is less than the number of permitted errors associated with the active device. In this manner, the errors in messages downloaded to an external device can be advantageously controlled such that the active device does not receive messages which have too many errors.

This can be very useful when messages are to be downloaded to both intelligent devices, e.g., computers, and non-intelligent devices, e.g., printers. When messages are downloaded to a printer, for instance, it may be very undesirable to download messages containing a large number of errors because the erroneous messages could be confusing or even indecipherable to the user. On the other hand, messages downloaded to an intelligent computing device may contain a large number of errors if software in the computing device is to be utilized to attempt to further correct the message. The computing device could, for example, employ a conventional spelling program to replace indecipherable words with English language words having a similar appearance. Additionally, when the computing device is coupled by modem to the paging terminal 105 (FIG. 1) which originally transmitted the message, a software program could be run which would request the retransmission of indecipherable or confusing words over telephone lines to the computing device for substitution into the erroneous message.

According to the present invention, the CPU 320, the RAM 325, the PROM 330, the error detector/corrector 335, and the status memory 350 can be implemented by using a microcomputer (not shown), such as a MC68HC05 microcomputer manufactured by Motorola, Inc. of Schaumburg, Ill. Alternatively, the listed elements could be implemented in other devices or hard-wired logic capable of performing equivalent operations. The data port 340 can be implemented using any of a number of conventional data ports, such as an RS-232 compatible data port.

Figure 5:
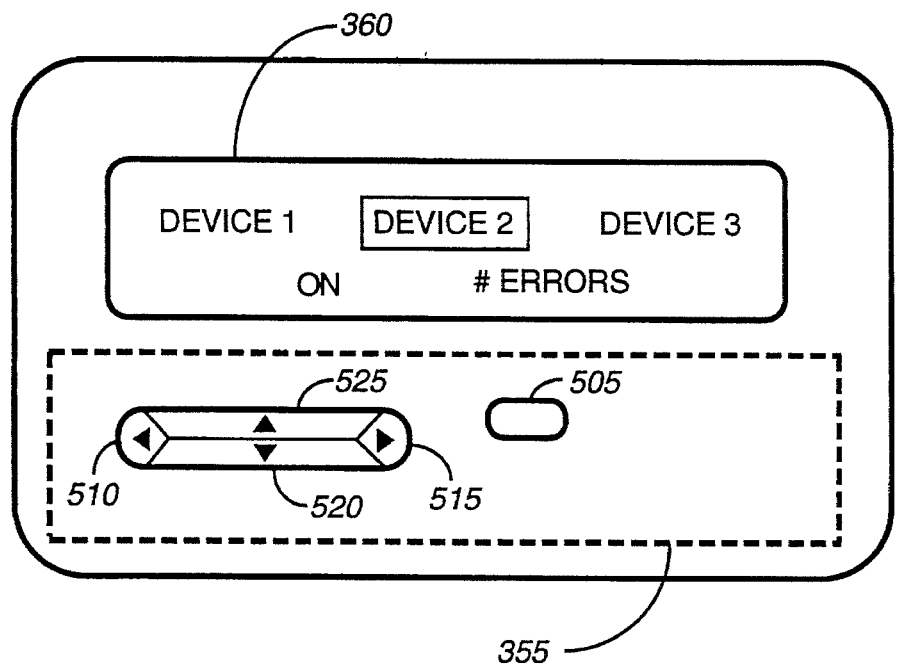
FIG. 5 is an illustration depicting the controls and display on the exterior of the radio receiver of FIG. 3 in accordance with the preferred embodiment of the present invention.
Figure 4:
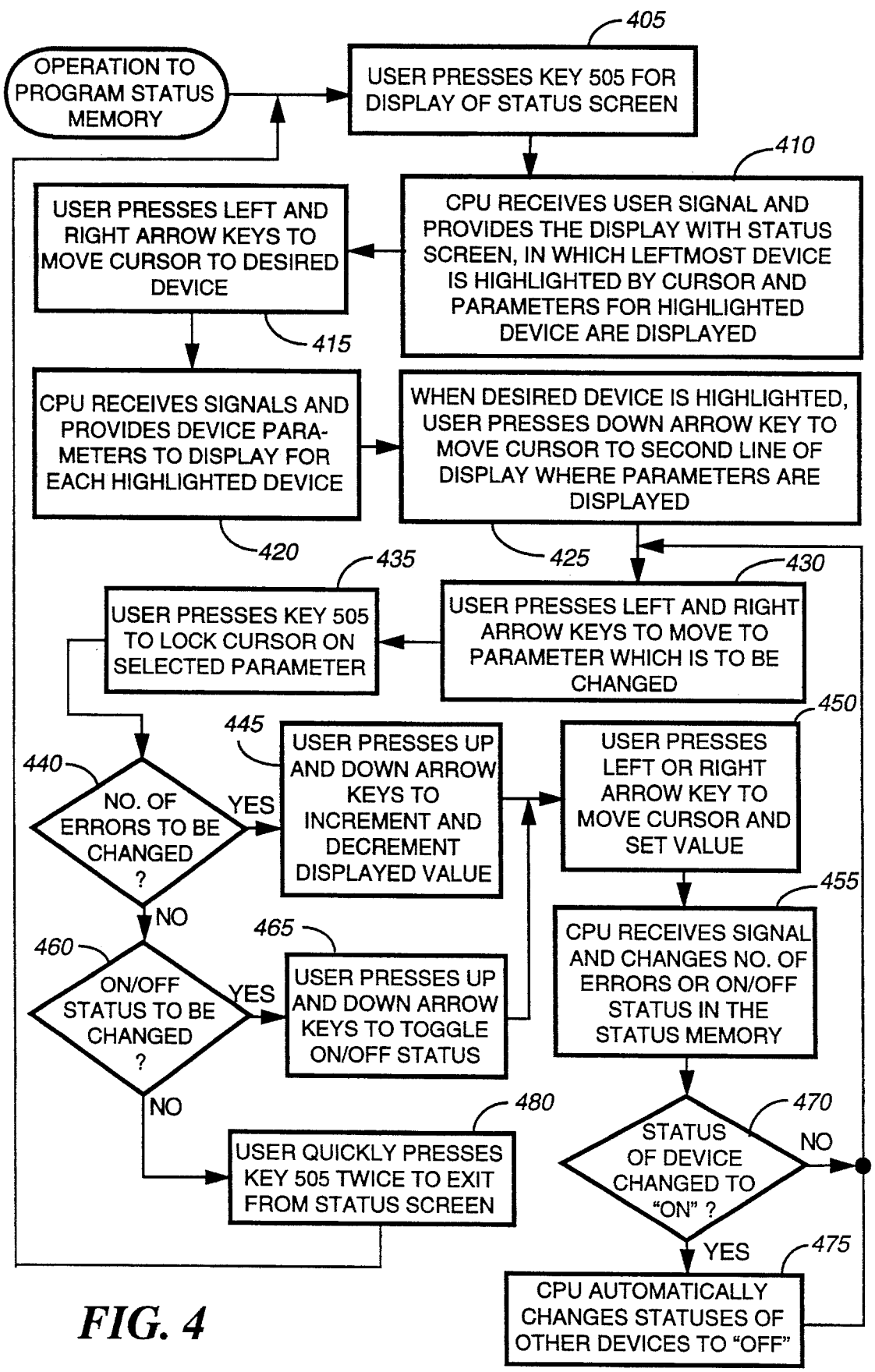
FIG. 4 is a flowchart depicting the programming of a status memory included in the radio receiver of FIG. 3 in accordance with the preferred embodiment of the present invention.

When the radio receiver 110 further comprises a display 360, data included in the status memory 350 can be easily programmed by the user. Referring together to FIGS. 4 and 5, one method for programming the status memory 350 is illustrated.

FIG. 4 is a flowchart depicting a method for user-programming the status memory 350. FIG. 5 is an illustration of the exterior of the radio receiver 110, which includes the display 360 and controls 355. When, at step 405 (FIG. 4), the user presses control key 505 (FIG. 5) of the radio receiver 110, the CPU 320 receives the user signal, at step 410, and provides the display 360 with a status screen, as shown in FIG. 5. The status screen includes a first line of the display 360 on which the external devices included in the status memory 350 are displayed. When, for example, three external devices are included in the status memory 350, "device 1", "device 2", and "device 3" are displayed on the first line of the display 360. When the status screen is first displayed, the leftmost device is highlighted by a cursor, and the number of permitted errors and the on/off status for the highlighted device are displayed on a second line of the display 360.

Preferably, the user presses, at step 415, left and right arrow keys 510, 515 (FIG. 5) to move the cursor to the desired device. The CPU 320 receives the user signals, at step 420, and provides the on/off status and number of permitted errors to the display 360 for each device as it is highlighted. When the desired device is highlighted, the user presses, at step 425, the down arrow key 520 to move the cursor to the second line of the display 360, then presses, at step 430, the left and right arrow keys 510, 515 to move the cursor to the displayed parameter which is to be changed. When the desired parameter is highlighted by the cursor, the user, at step 435, presses key 505 to lock the cursor to the highlighted parameter. When, at step 440, the number of permitted errors is to be changed, the user presses, at step 445, the up and down arrow keys 520, 525 to increment and decrement, respectively, the displayed number of errors by either one or another predetermined value. The user then, at step 450, presses the left or right arrow key 510, 515 to remove the highlighting from the number of errors, thereby setting the changed value. At step 455, the CPU 320 receives a signal in response to the removal of the highlighting and changes, in the status memory 350, the number of permitted errors for the device to the new number of permitted errors set by the user.

When, at step 460, the on/off status of the selected device is to be changed, the user presses the up or down arrow keys 525, 520 to change the displayed status, at step 465. More specifically, each press of the up or down arrow keys 525, 520 will toggle the displayed status between "off" and "on". Thereafter, the user presses, at step 450, the left or right arrow keys 510, 515 to remove the highlighting from the selected status parameter, and the CPU 320 sets, at step 455, the changed status in the status memory 350. Additionally, when the status of a device has been changed to "on", at step 470, the CPU 320 automatically sets all other devices to "off" in the status memory 350, at step 475. When no further parameters are to be set, the user, at step 480, quickly presses key 505 twice to exit the programming mode and resume normal receiver operation.

As described above, the user can conveniently change the number of permitted errors and the on/off status of a device when a display 360 in included in the radio receiver 110. Therefore, the user conveniently avoids having to return the radio receiver 110 to the service center for reprogramming each time a different device is to be coupled to the radio receiver 110.

Figure 6:
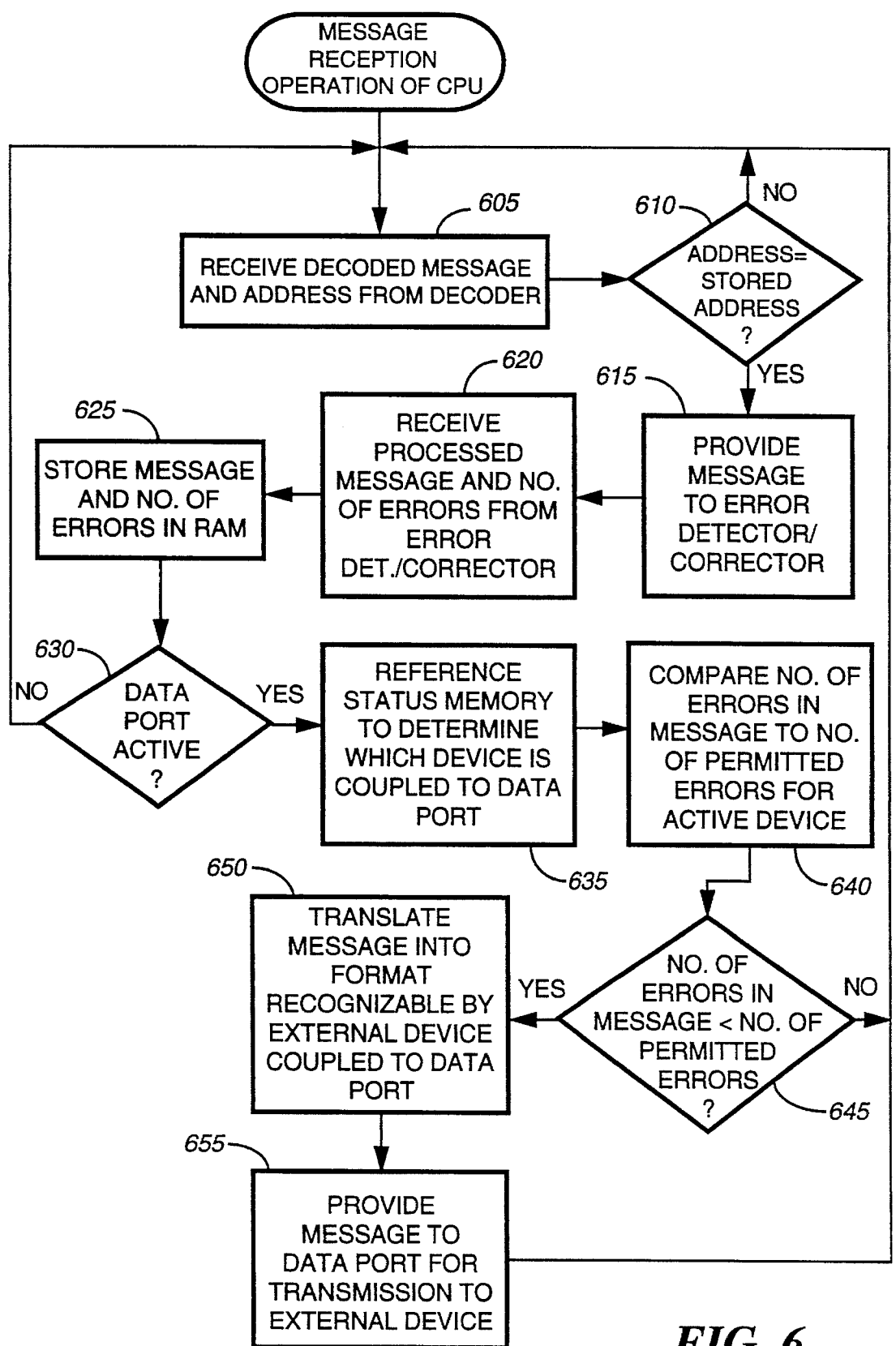
FIG. 6 is a flowchart illustrating the operation of a central processing unit included in the radio receiver of FIG. 3 in response to message reception in accordance with the preferred embodiment of the present invention.

FIG. 6 is a flowchart depicting the message reception operation of the CPU 320 (FIG. 3) in accordance with the preferred embodiment of the present invention. Initially, the CPU 320 receives, at step 605, a decoded message and address from the decoder 315, in response to which the received address is compared, at step 610, to the stored address in the PROM 330. When the received address is equivalent to the stored address, the message is provided, at step 615, to the error detector/corrector 335 (FIG. 3) for error correction in a manner well known to one of ordinary skill in the art. The CPU 320 then receives, at step 620, the processed message and an indication of the number of errors which are included in the message from the error detector/corrector 335. When BCH error correction techniques are employed, the message can be provided to the error detector/corrector 335 one message word at a time such that the CPU 320 can also determine in which message words any errors are located. Subsequently, the CPU 320 stores, at step 625, the message and the number of errors included therein in the RAM 325. The CPU 320 thereafter determines, at step 630, whether or not the data port 340 is active, i.e., whether an external device is coupled to the data port 340. When a conventional data port 340 is included in the radio receiver 110, the active status of the data port 340 is often indicated by a high voltage present at a predetermined pin of a connection between the data port 340 and the external device. When the voltage at the predetermined pin indicates that the data port 340 is not active, the radio receiver 110 continues to receive, process, and stored incoming messages.

When the data port 340 is active, i.e., when the radio receiver 110 is coupled to an external device, the CPU 320, at step 635, references the status memory 350 (FIG. 3) to determine which device is currently an active device enabled to receive messages from the radio receiver 110. The active device, as described above, is designated with an "on" status. Next, the CPU 320 compares, at step 640, the number of errors included in the message with the stored number of permitted errors for the active device. When, at step 645, the number of errors is greater than the number of permitted errors, the message is not downloaded to the data port 340. However, when the number of errors in the message is less than the number of permitted errors, the message is retrieved from the RAM 325, and the CPU 320, at step 650, processes the message to place it in a form which will be recognized by the external device. When, for example, the active device is a modem, the CPU 320 provides the message to the data port 340 in a form wherein the modem can translate the message into DTMF (dual tone, multi-frequency) signals for transmission over telephone lines. The processing of the message can be done by executing a particular downloading subroutine which is associated with the current active device and stored in the PROM 330 (FIG. 3). After processing the message, the message is provided, at step 655, to the data port 340 for transfer to the external device coupled to the radio receiver 110.

Figure 7:
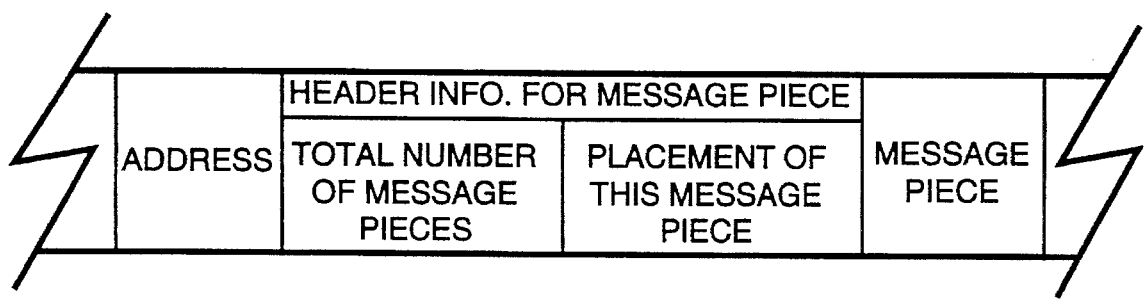
FIG. 7 is a signalling diagram illustrating a radio frequency signal transmitted to a radio receiver in accordance with an alternate embodiment of the present invention.

In accordance with an alternate embodiment of the present invention, shown in FIG. 7, the RF signal transmitted by a paging terminal to a radio receiver includes message pieces rather than an entire message. This can occur, for instance, when extremely lengthy messages are to be sent to the radio receiver. In this situation, header information appended to the address preferably indicates the number of message pieces which will be sent to form the complete message and the placement of the current message piece within the complete message. If the radio receiver does not receive all of the message pieces, the number of permitted errors for a computer can be set such that the computer is provided with the message even when it is not complete. Thereafter, the computer can conveniently request, via modem, the missing message pieces and form the complete message, which can then be displayed by the user. This implementation of the present invention allows a user to read a complete and accurate message even when portions of the complete message are entirely "missed" by the radio receiver.

In summary, the radio receiver as described above can be conveniently coupled to different types of external devices, such as printers or computers, for downloading received messages to the external devices. The types of external devices to which the radio receiver can be coupled are listed in a status memory, which also includes message error criteria which must be met by a message before that message is downloaded to the external device coupled to the radio receiver. Upon receiving a message, the radio receiver corrects the message, if possible, and stores with each message an indication of the number of errors included in that message. Then, when an external device is coupled to the radio receiver, the radio receiver determines which of the external devices listed in memory is the "active" device, i.e., the device coupled to the radio receiver. Subsequently, each stored message which includes a number of errors less than a stored value associated with the active device is downloaded to the active device.

The assignment of different numbers of permitted errors to different types of external devices allows the radio receiver to process the messages differently for intelligent devices, e.g., computers, and nonintelligent devices, e.g., printers. By way of example, messages having a large number of errors may be transferred to intelligent devices, which can then further process the messages to render them more accurate, while only extremely accurate messages are transferred to the non-intelligent devices, which typically have no capability to further process the messages.

It may be appreciated by now that there has been provided a method and apparatus for processing and selectively forwarding messages to different types of external devices coupled to a radio receiver.

What is claimed is:

1. A method for processing and forwarding information received by a radio receiver capable of coupling to first and second external devices to communicate therewith, the method comprising the steps of:

receiving a message comprising words;

processing the message to correct errors in correctable words and detect errors in non-correctable words;

storing the message, as processed, in a memory;

counting, in response to the storing step, a number of remaining errors within the message after the words of the message have been processed to correct and detect the errors in the words;

determining which of the first and second external devices is an active device to which the radio receiver is coupled;

comparing, in response to the determining step, the number of remaining errors with a stored number of permitted errors associated with the active device; and providing the message to the active device in response to determining that the number of remaining errors does not exceed the stored number of permitted errors.

2. The method of claim 1, wherein:

the radio receiver comprises a display;

the method further comprises the step of displaying the message on the display when the words have been fully corrected so that no errors remain in the message; and the providing step is independent of the displaying step.

3. The method of claim 1, further comprising the step of not providing the message to the active device in response to determining that the number of remaining errors exceeds the stored number of permitted errors.

4. The method of claim 1, further comprising the step of storing, prior to the receiving step, first and second numbers of permitted errors associated, respectively, with the first and second external devices.

5. The method of claim 4, wherein:

the determining step comprises the step of determining that the first external device is the active device;

the comparing step comprises the step of comparing, in response to the determining step, the number of remaining errors in the message with the first number of permitted errors, rather than with the second number of permitted errors, wherein the first number of permitted errors is associated with the first external device; and the providing step comprises the step of providing the message to the first external device in response to determining that the number of remaining errors does not exceed the first number of permitted errors.

6. The method of claim 5, further comprising the step of not providing the message to the first external device in response to determining that the number of remaining errors exceeds the first number of permitted errors.

7. The method of claim 4, wherein:

the determining step comprises the step of determining that the second external device is the active device;

the comparing step comprises the step of comparing, in response to the determining step, the number of remaining errors in the message with the second number of permitted errors, rather than with the first number of permitted errors, wherein the second number of permitted errors is associated with the second external device; and the providing step comprises the step of providing the message to the second external device in response to determining that the number of remaining errors does not exceed the second number of permitted errors.

8. The method of claim 7, further comprising the step of not providing the message to the second external device in response to determining that the number of remaining errors exceeds the second number of permitted errors.

9. A radio receiver for coupling to first and second external devices and for receiving a message comprising words, the radio receiver comprising:

an error detector/corrector for processing the words of the message to correct errors in correctable words and detect errors in non-correctable words;

a memory coupled to the error detector/corrector for storing the message, including words that have been corrected and words that have not been corrected;

counting means coupled to the memory for counting, in response to storage of the message, a number of remaining errors included in the message after processing of the words of the message by the error detector/corrector;

storing means for storing first and second numbers of permitted errors associated, respectively, with the first and second external devices, and for storing an indication of which of the first and second external devices is an active device to which the radio receiver is coupled;

comparing means coupled to the storing means for comparing the number of remaining errors in the message with a selected number included in the first and second numbers of permitted errors, wherein the selected number is associated with the active device; and providing means coupled to the comparing means and the memory for providing the message to the active device only in response to a determination that the number of remaining errors does not exceed the selected number.

10. The radio receiver of claim 9, further comprising controls by which the user enters the first and second numbers of permitted errors.

11. The radio receiver of claim 9, wherein the counting means comprises a processing unit.

12. The radio receiver of claim 9, wherein the providing means comprises a data port.

13. The radio receiver of claim 9, wherein:

the first external device comprises a computer;

the second external device comprises a printer; and the second number of permitted errors is greater than the first number of permitted errors.

14. The radio receiver of claim 9, further comprising presenting means for presenting the message only when the words of the message have been fully corrected so that no errors remain in the message, wherein the providing means and the presenting means operate independently.

15. A communication system for providing messaging, the communication system comprising:

a non-intelligent device for receiving and presenting data;

an intelligent device for receiving, correcting, and then presenting information; and a radio receiver for receiving a message comprising words, for coupling to an active device, comprising one of the intelligent and non-intelligent devices, and for selectively forwarding the message thereto, the radio receiver comprising:

a memory for storing first and second numbers of permitted errors associated, respectively, with the intelligent and non-intelligent devices and for storing an indication of which of the intelligent and non-intelligent devices is the active device to which the radio receiver is coupled;

an error detector/corrector for processing the words of the message to correct errors in correctable words and detect errors in non-correctable words;

counting means coupled to the error/detector/corrector for counting, in response to the processing of the words of the message, a number of remaining errors included in the message;

comparing means coupled to the counting means for comparing the number of remaining errors in the message with a selected number included in the first and second numbers of permitted errors, wherein the selected number is associated with the active device; and providing means coupled to the comparing means for providing the message to the active device only in response to a determination that the number of remaining errors does not exceed the selected number.

16. The communication system of claim 15, wherein the radio receiver further comprises presenting means for presenting the message only when the words of the message have been fully corrected so that no errors remain in the message, wherein the providing means and the presenting means operate independently.

17. The communication system of claim 15, wherein:

the intelligent device comprises a computer;

the non-intelligent device comprises a printer; and the first number of permitted errors, which is associated with the intelligent device, is greater than the second number of permitted errors, which is associated with the non-intelligent device.

18. The communication system of claim 15, wherein the intelligent device comprises correcting means for further correcting, if necessary, the message provided by the radio receiver prior to presenting the message.

19. The communication system of claim 15, wherein the comparing means comprises a processing unit.

20. The communication system of claim 15, wherein the providing means comprises a data port.

* * * * *